(12) United States Patent
Wu

(10) Patent No.: US 7,554,557 B2
(45) Date of Patent: Jun. 30, 2009

(54) DEVICE AND METHOD FOR IMAGE COMPRESSION AND DECOMPRESSION

(75) Inventor: Hung Wei Wu, Chung Ho (TW)

(73) Assignee: Silicon Integrated Systems Corp., Hsin Chu (TW)

( * ) Notice: Subject to any disclaimer, the term of this patent is extended or adjusted under 35 U.S.C. 154(b) by 498 days.

(21) Appl. No.: 11/390,068

(22) Filed: Mar. 28, 2006

(65) Prior Publication Data

US 2007/0237391 A1    Oct. 11, 2007

(51) Int. Cl.
*G09G 5/02* (2006.01)
(52) U.S. Cl. .................. 345/604; 345/427; 345/645; 382/166; 382/232
(58) Field of Classification Search .......... 345/604, 345/427, 645; 382/166, 232
See application file for complete search history.

(56) References Cited

U.S. PATENT DOCUMENTS

| 5,463,570 | A  | * | 10/1995 | Nakata ................ 708/551 |
| 5,568,192 | A  | * | 10/1996 | Hannah ............... 348/222.1 |
| 5,822,452 | A  | * | 10/1998 | Tarolli et al. ............ 382/166 |
| 6,384,838 | B1 | * | 5/2002  | Hannah ............... 345/601 |
| 6,594,385 | B2 | * | 7/2003  | Grohs et al. ............ 382/166 |
| 6,621,499 | B1 | * | 9/2003  | Callway .............. 345/629 |
| 6,825,853 | B2 | * | 11/2004 | Jiang et al. ............ 345/604 |
| 6,826,301 | B2 | * | 11/2004 | Glickman ............. 382/166 |
| 6,898,323 | B2 | * | 5/2005  | Schwartz et al. ........ 382/240 |
| 7,154,507 | B1 | * | 12/2006 | Moreton et al. .......... 345/582 |
| 7,158,681 | B2 | * | 1/2007  | Persiantsev ........... 382/236 |
| 7,164,804 | B2 | * | 1/2007  | Boliek et al. ........... 382/248 |
| 2001/0043753 | A1 | * | 11/2001 | Grohs et al. ............ 382/248 |
| 2005/0168477 | A1 | * | 8/2005  | Schoner .............. 345/589 |

* cited by examiner

*Primary Examiner*—Javid A Amini
(74) *Attorney, Agent, or Firm*—Muncy, Geissler, Olds & Lowe, PLLC

(57) ABSTRACT

An image compression device includes a floating-point texture-loading unit, a shader, a RGB to YCrCb compressor, and a parameter adjusting unit. The floating-point texture-loading unit receives raw image data that includes N number of RGB pixels. The shader receives the raw image data and shades the N number of RGB pixels. The RGB to YCrCb compressor receives the shaded image data and calculates the brightness/chroma value of each of the RGB pixels, wherein the chroma value of the RGB pixel having the smallest brightness value among all the RGB pixels is selected as a common chroma value for all the RGB pixels. The parameter adjusting unit receives and adjusts N number of brightness values of the RGB pixels and the common chroma value and stores them in a form of compressed image data into a memory.

6 Claims, 13 Drawing Sheets

DEVICE AND METHOD FOR IMAGE COMPRESSION AND DECOMPRESSION

BACKGROUND OF THE INVENTION (a) Field of the Invention

The invention relates to a device and method for image processing, and particularly to a device and method for image compression and decompression.

(b) Description of the Related Art

Typically, the wide range of luminance levels found in real scenes may up to 100,000:1, which corresponds to information stored in high dynamic range (HDR) images. However, the human eye may sense a range of luminance levels only up to 10,000:1, which is narrower but is still broad enough to perceive tiny variations in luminance levels.

FIG. 1 shows a block diagram illustrating a conventional three dimensions (3D) graphic system 10. The 3D graphic system 10 includes a graphic processing device 11 and a memory 12. The graphic processing device 11 may be a 3D graphic card. The image data processed and stored by the 3D graphic system 10 are represented by fix-point numbers (i.e., integers), and thus only a narrow dynamic range of luminance levels between 0 and 1 can be obtained.

Taking an 8-bit fix-point number as an example, the value "00000000" is represented as "0.0f", the value "11111111" is represented as "1.0f", and thus its dynamic range is expressed as [0,1]. Since the fix-point number representation may only express a narrow dynamic range, the image rendered by the 3D graphic system 10 will be too dark or too bright as not to accurately reflect luminance variations in real scenes.

In order to improve the narrow dynamic range provided by the 3D graphic system 10, a 3D graphic system 20 that utilizes a floating-point number representation is proposed to process and store image data. Referring to FIG. 2A, the 3D graphic system 20 includes a graphic processing device 21 and a memory 22. The graphic processing device 21 may be a 3D graphic card. The operation and architecture of the 3D graphic system 20 is similar to the 3D graphic system 10, except the 3D graphic system 20 utilizes the floating-point number representation to process and store image data. Hence, a dynamic range of luminance levels obtained by the 3D graphic system 20 is expanded up to 100,000:1. Therefore, the 3D graphic system 20 can provide a high dynamic range (HDR) of luminance levels. The reason of how the floating-point number representation achieves a high dynamic range of luminance levels is described below.

First, a typical floating-point number is expressed as:

$$\text{sign[exp].man} \tag{1.1}$$

where "sign" is the sign bit 1 or −1, "exp" is the exponent, and "man" is the mantissa. Further, a numeral expression of a floating-point number can be written as:

$$(-1)^{\text{sign}} * 1.\text{man} * 2^{(\text{exp}-15)} \tag{1.2}$$

For example, a floating number s[5].10 indicates the exponent is 5 and the mantissa is 10, and, substituting them into equation 1.2, the numeral value of the floating number s[5].10 is found to have a maximum of 131008. Hence, when a float-point number representation of s[5].10 is used in the 3D graphic system 20, the maximum numeral value that the 3D graphic system 20 can designate is 131008. Hence, a dynamic range of luminance levels obtained by the 3D graphic system 20 is expanded up to 100,000:1 so as to accurately reflect luminance variations in a real world.

FIG. 2B shows a block diagram illustrating the graphic processing device 21. The graphic processing device 21 includes a floating-point texture-loading unit 21a, a shader 21b, and a parameter adjusting unit 21c. The parameter adjusting unit 21c may be a rasterizer. The floating-point texture-loading unit 21a reads raw image data Or having a texture image format. Next, the shader 21b receives and then shades the raw image data Or. The parameter adjusting unit 21c receives and then adjusts the shaded raw image data Or' and outputs an adjusted image data At to the memory 22. The adjusted image data At to be stored in the memory 22 is in a form of a rendered target image format. The parameter adjusting unit 21c adjusts the shaded raw image data Or' by performing at least one operation of gamma correction, error correction, and color mixing. After stored the adjusted image data At, the memory 22 converts the adjusted image data At from a rendered target image format into a texture image format to improve image data access speed.

As described above, the 3D graphic system 20 utilizes a floating-point number representation to process and store image data so as to expand the dynamic range of the luminance levels. However, the occupied memory space required for the floating-point number representation is larger than that for a fix-point number representation, and thus the data amount handled by the graphic processing device 21 is considerably huge to lower its processing speed and increase occupied memory space. For example, in a ARGB format (A is a color-mixing value), a pixel P represented as a 8-bits fix-point number requires a data amount of 32 bits (=8*4) in graphic processing; however, the same pixel P represented as a 16-bits floating-point number requires a data amount of 64 bits (=16*4) in graphic processing. Thus, it is clearly seen the floating-point number representation for a pixel will largely occupy the memory space.

Hence, though the 3D graphic system 20 may achieve a high dynamic range of luminance levels, the huge data amount it processes and stores may in turn lower its processing speed and increase occupied memory space to result in an inferior performance.

BRIEF SUMMARY OF THE INVENTION

Hence, an object of the invention is to provide image compression and decompression devices and methods that allows for reducing the data amount and occupied memory space of image data representing as floating-point numbers.

According to the invention, an image compression device includes a floating-point texture-loading unit, a shader, a RGB to YCrCb compressor, and a parameter adjusting unit. The floating-point texture-loading unit receives raw image data that comprises N number of RGB pixels (N is a positive integer) and are represented as floating-numbers. The shader receives the raw image data and shades the N number of RGB pixels to generate shaded image data. The RGB to YCrCb compressor receives the shaded image data and calculates the brightness/chroma value of each of the RGB pixels, wherein the chroma value of the RGB pixel having the smallest brightness value among all the RGB pixels is selected as a common chroma value for all the RGB pixels. The parameter adjusting unit receives and adjusts N number of brightness values of the RGB pixels and the common chroma value and stores the N number of brightness values and the common chroma value in a form of compressed image data into a memory. The compressed image data are also represented as floating-numbers.

The invention also provides an image decompression device that includes a floating-point texture-loading unit, a YcrCb to RGB decompressor, a shader, and a parameter adjusting unit. The image decompression device decompresses compressed image data that comprise N number of brightness values (N is a positive integer) and a common chroma value for N number of RGB pixels. The floating-point texture-loading unit receives the compressed image data,and the YcrCb to RGB decompressor reads the compressed image data and generating N number of RGB pixels converted from N number of the brightness values and the common chroma value. The shader shades the N number of RGB pixels, and the parameter adjusting unit receives and adjusts the N number of shaded RGB pixels and stores the N number of shaded RGB pixels in a form of decompressed image data into a memory. The compressed image data and the decompressed image data are represented as floating-numbers.

According to the invention, since most chroma information not sensitive to the human eye is discarded by means of the RGB to YcrCb compressor, and the mantissa of the common chroma value Cr'Cb' is truncated to further decrease the data amount of the chroma information, the 3D graphic system of the invention may, under the condition that a high dynamic range of luminance levels still remains, have an enhance image processing performance and a reduced occupied memory space.

Further, an image compression method performed by the image compression device includes the steps of: providing raw image data including a plurality of RGB pixels represented as floating-numbers; calculating the brightness/chroma value of each of the RGB pixels; selecting the chorma value of the pixel having the smallest brightness value among all the RGB pixels as a common chroma value; and compressing the brightness values of all the RGB pixels and the common chroma value to form compressed image data represented as floating-numbers. Also, an image decompression method is provided for decompressing compressed image data that represented as floating-numbers and comprise a plurality of brightness values and a common chroma value. The image decompression method includes the steps of: reading the plurality of brightness values and the common chroma value, and converting the plurality of brightness values and the common chroma value into a plurality of RGB pixels.

DETAILED DESCRIPTION OF THE INVENTION

Figure 1:
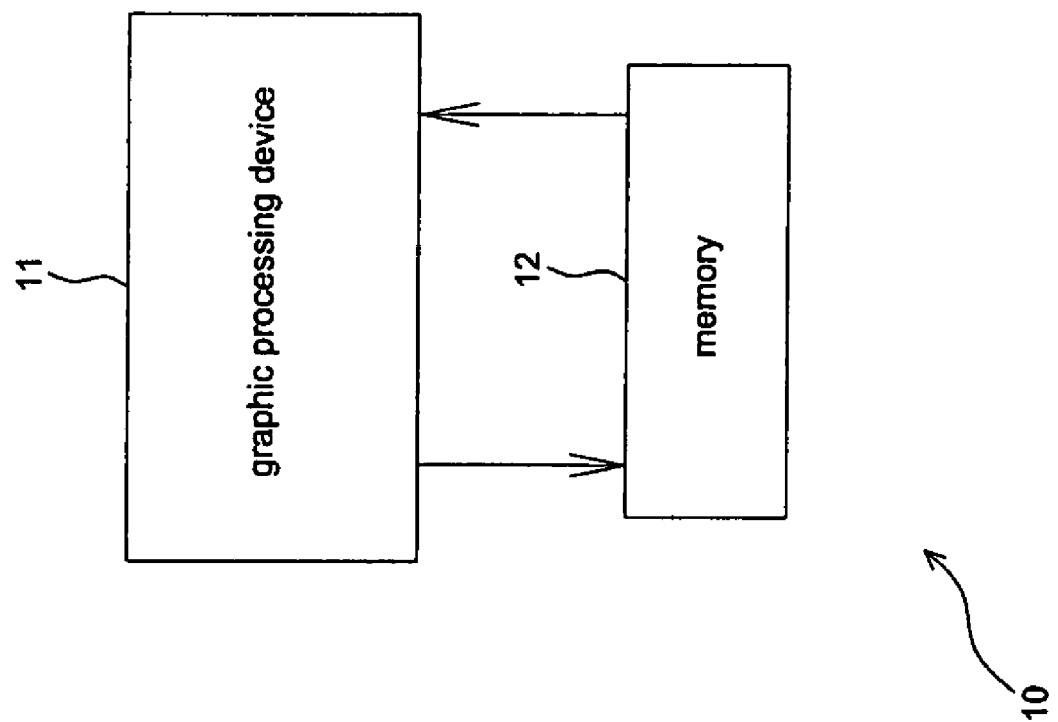
FIG. 1 shows a block diagram illustrating a conventional three dimensions (3D) graphic system.
Figure 2A:
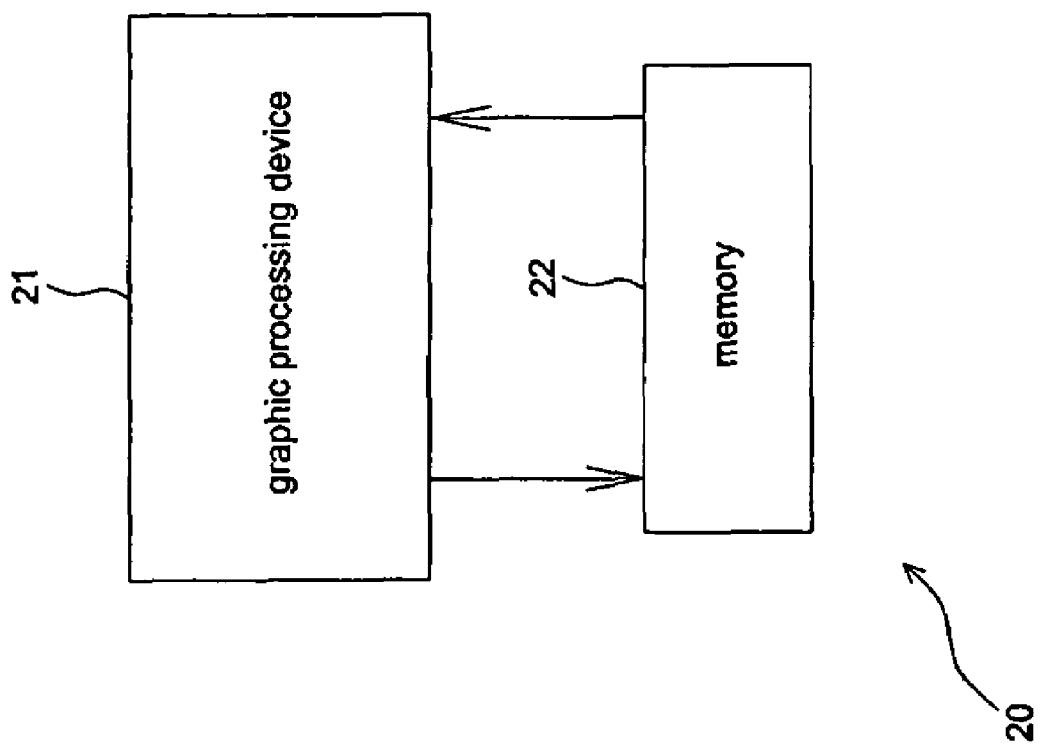
FIG. 2A shows a block diagram illustrating another conventional 3D graphic system.
Figure 2B:
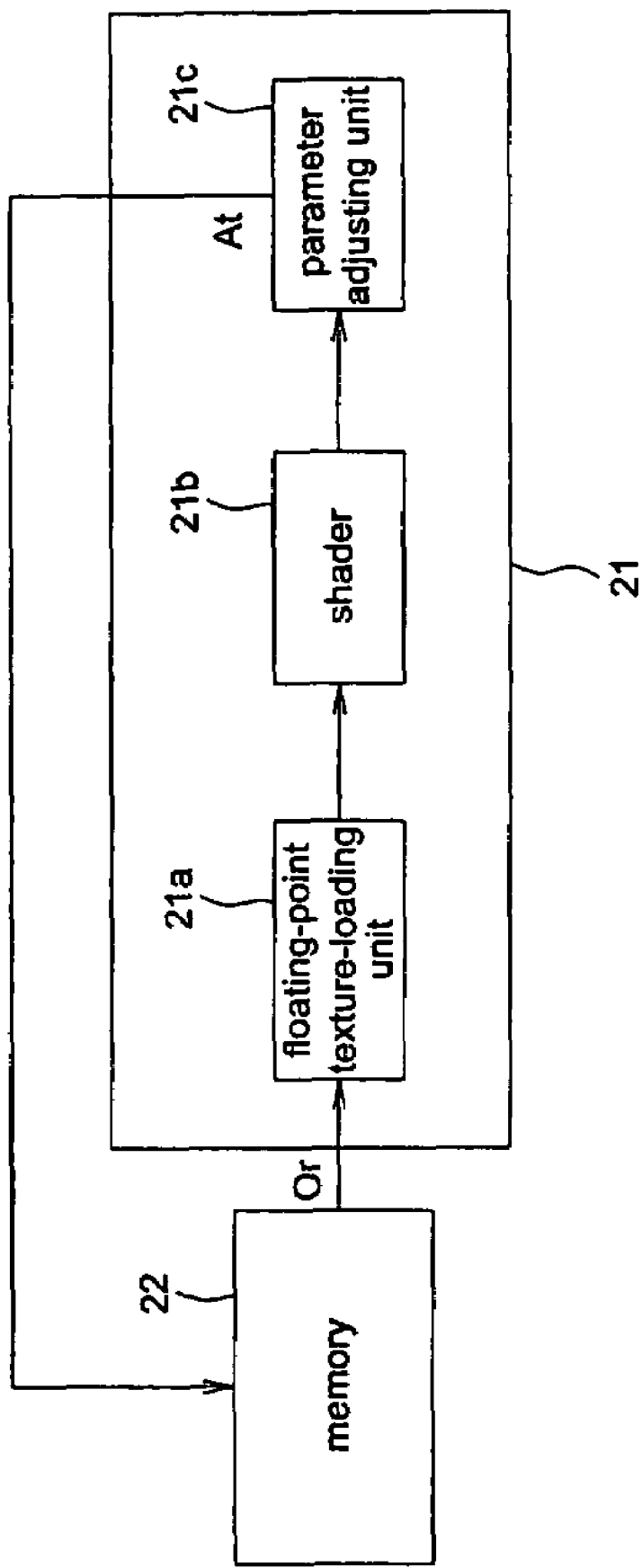
FIG. 2B shows a block diagram illustrating a conventional graphic processing device shown in FIG. 2A.
Figure 3A:
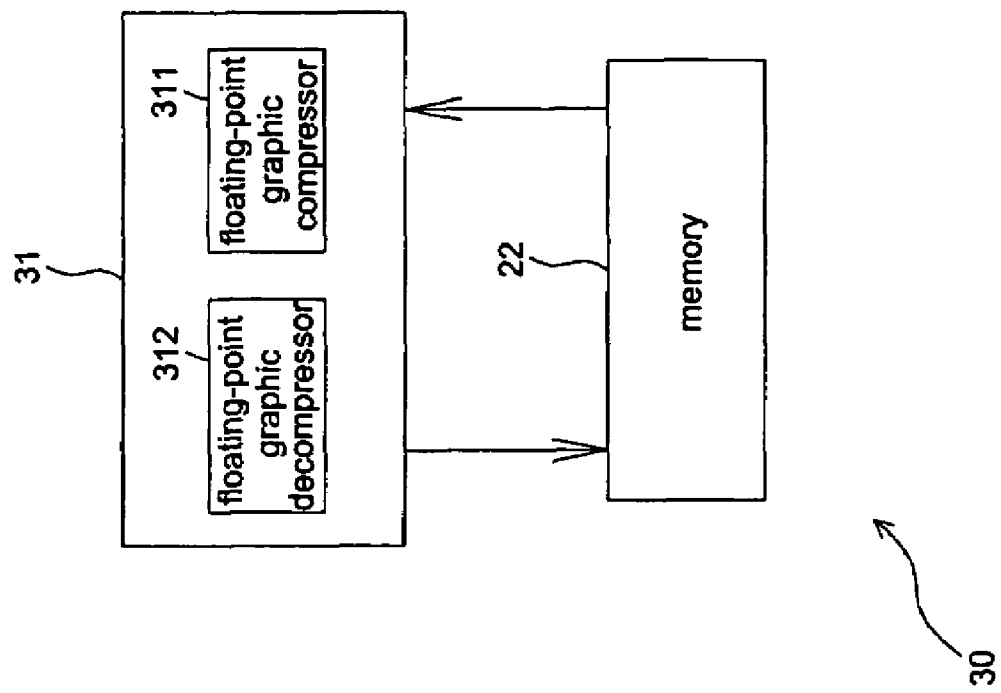
FIG. 3A shows a block diagram illustrating a 3D graphic system according to the invention.

FIG. 3A shows a block diagram illustrating a 3D graphic system according to the invention. Referring to FIG. 3A, the 3D graphic system 30 includes a graphic processing device 31 and a memory 22. The graphic processing device 31 includes a floating-point graphic compressor 311 and a floating-point graphic decompressor 312. A RGB/YCrCb conversion for processing pixels represented as floating-point number is being applied to the graphic processing device 31.

Typically, the human eye may perceive tiny variations in brightness, but not so in chroma. Thus, according to the invention, a common chroma value Cr'Cb' may replace all chroma values $Cr_1Cb_1$-$Cr_NCb_N$ (N is a positive integer) during a floating -point graphic procession to considerably reduce data amount.

Figure 3B:
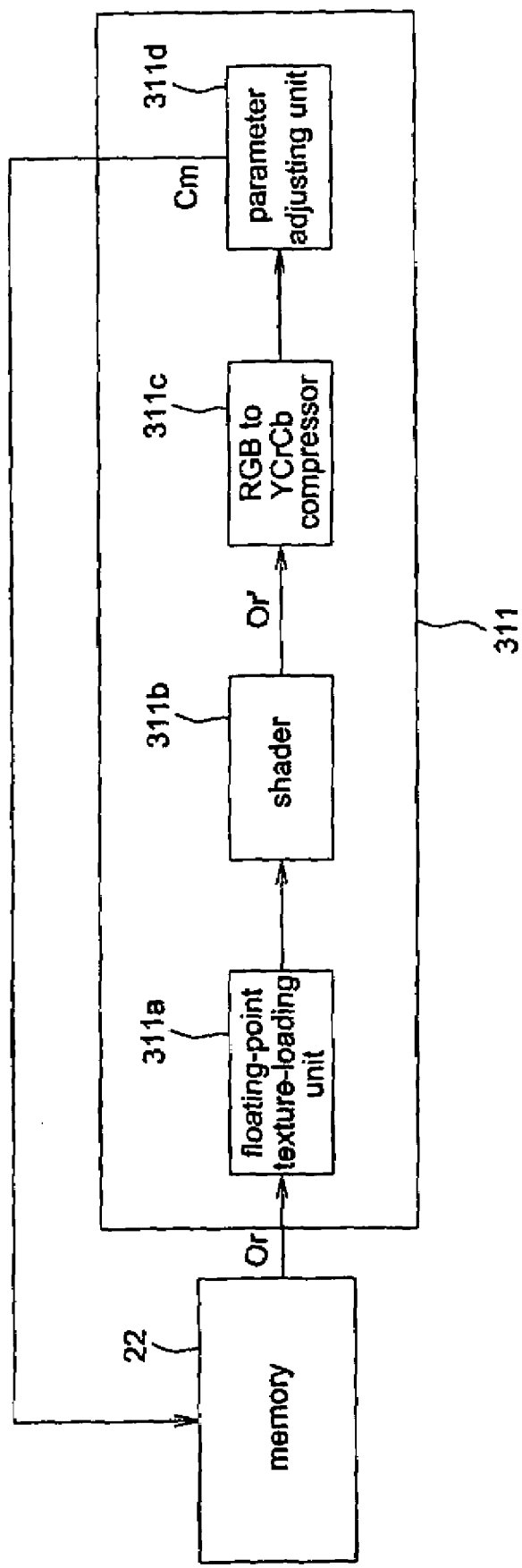
FIG. 3B shows a block diagram illustrating the floating-point graphic compressor shown in FIG. 3A.

FIG. 3B shows a block diagram illustrating the floating-point graphic compressor 311 shown in FIG. 3A. The graphic compressor 311 includes a floating-point texture-loading unit 311a, a shader 311b, a RGB to YCrCb compressor 311c, and a parameter adjusting unit 311d. The parameter adjusting unit 311d may be a rasterizer.

The floating-point texture-loading unit 311a reads raw image data Or from memory 22. The raw image data Or, represented as floating-point numbers, are in a texture image format and include N number of RGB pixels $P1$-$P_N$. The shader 311b receives the raw image data Or and generates shaded image data Or' in which the N number of RGB pixels $P1$-$P_N$ are shaded. The RGB to YCrCb compressor 311c receives the shaded image data Or' and calculates the brightness/chroma value of each of the RGB pixels $P_1$-$P_N$, where the chroma value $Cr_QCb_Q$ of the pixel $P_Q$ (Q is a positive integer, $1 \leq Q \leq N$) that has a minimum brightness among all the pixels $P_1$-$P_N$ is served as a common chroma value Cr'Cb' for the N number of RGB pixels $P_1$-$P_N$. The parameter adjusting unit 311d receives N number of brightness values $Y_1$-$Y_N$ and the common chroma value Cr'Cb', and then it adjusts these values by performing at least one operation of gamma correction, error correction, and color mixing. The parameter adjusting unit 311d stores the adjusted brightness values $Y_1$-$Y_N$ and common chroma value Cr'Cb' in a form of compressed image data Cm into the memory 22. The compressed image data Cm are represented as floating-point numbers and in a rendered target image format. Further, in the memory 22, the compressed image data Cm are converted from a rendered target image format to a texture image format to accelerate reading of image data.

Figure 3C:
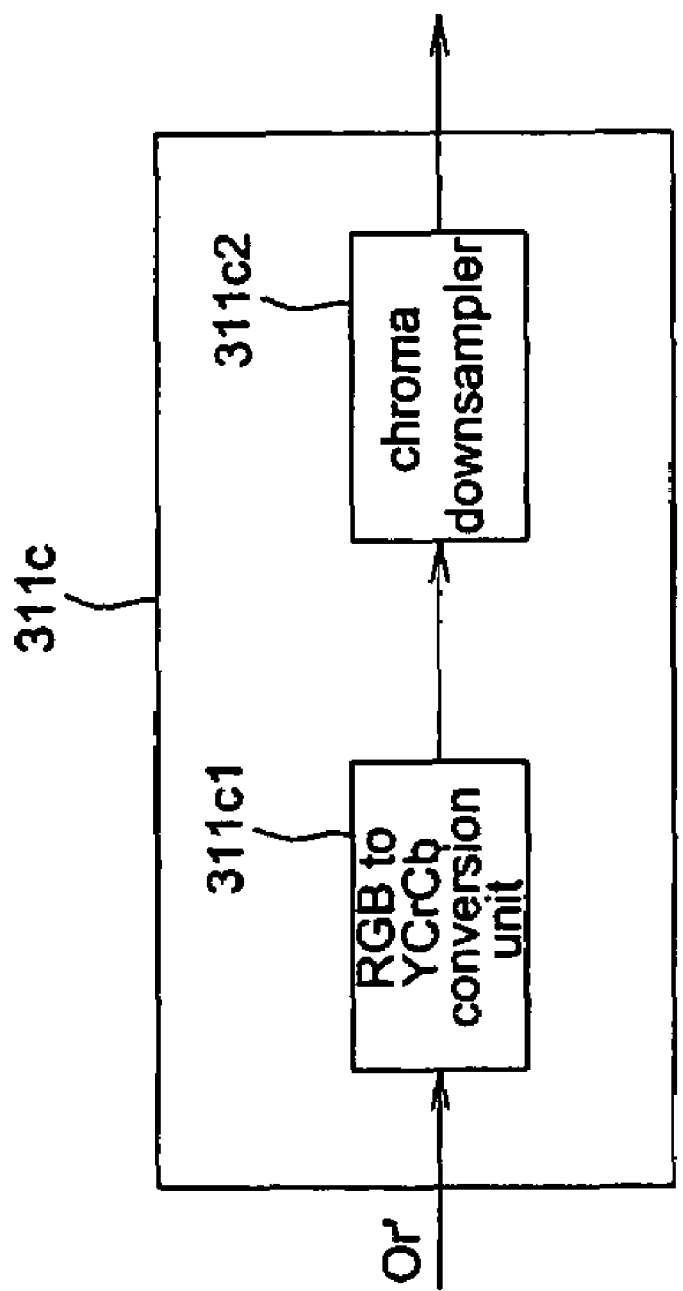
FIG. 3C shows a block diagram illustrating a RGB to YCrCb compressor according to an embodiment of the invention.
Figure 3D:
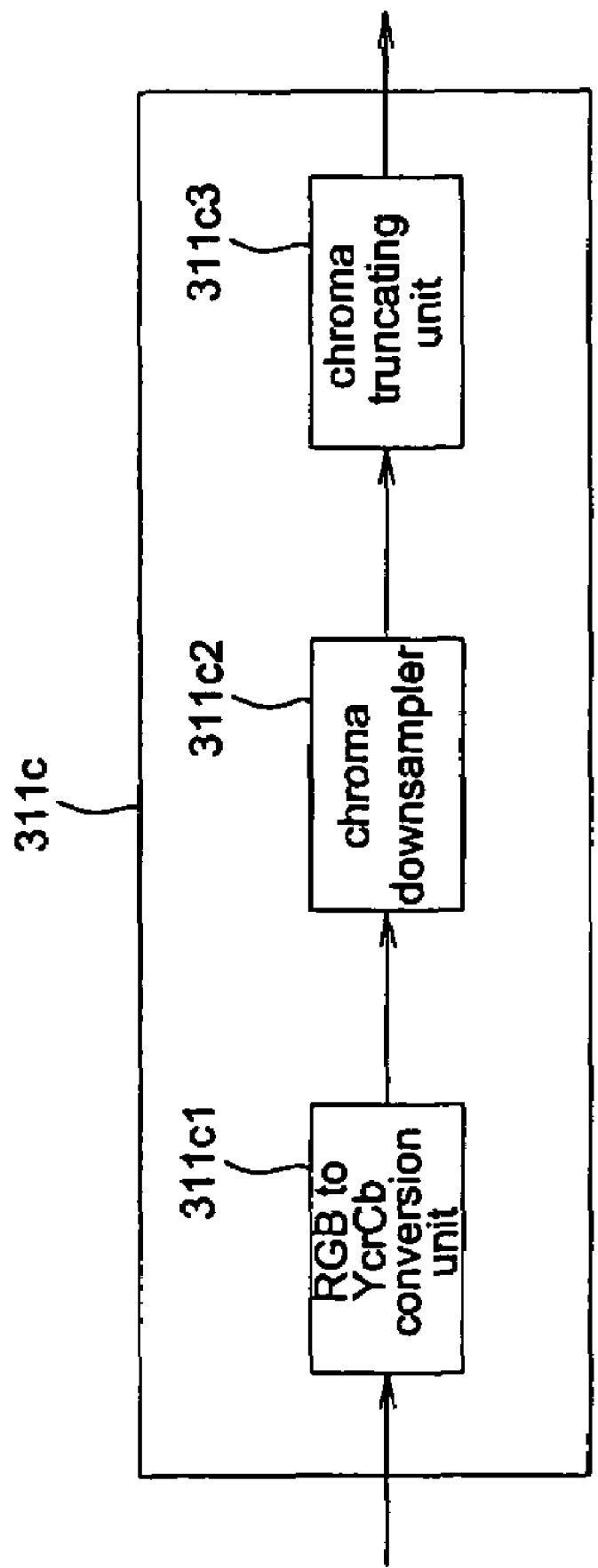
FIG. 3D shows a block diagram illustrating another RGB to YCrCb compressor according to an embodiment of the invention.

FIG. 3C shows a block diagram illustrating the RGB to YCrCb compressor 311c according to an embodiment of the invention. The RGB to YCrCb compressor 311c includes a RGB to YCrCb conversion unit 311c1 and a chroma downsampler 311c2. The RGB to YCrCb conversion unit 311c1 receives the shaded image data Or' and calculates the brightness/chroma value of each of the RGB pixels $P_1$-$P_N$. Then, the chroma downsampler 311c2 selects the chroma value $Cr_QCb_Q$, which is the chroma value of the pixel $P_Q$ that has a minimum brightness among all the RGB pixels $P_1$-$P_N$, as a common chroma value Cr'Cb' for all RGB pixels $P_1$-$P_N$, and meanwhile discards other chroma values. Besides, a chroma truncating unit 311c3 may be additionally provided to aid compression effect. As shown in FIG. 3D, the chroma truncating unit 311c3 truncates the mantissa of the common chroma value Cr'Cb' and then outputs the truncated value.

Figure 3E:
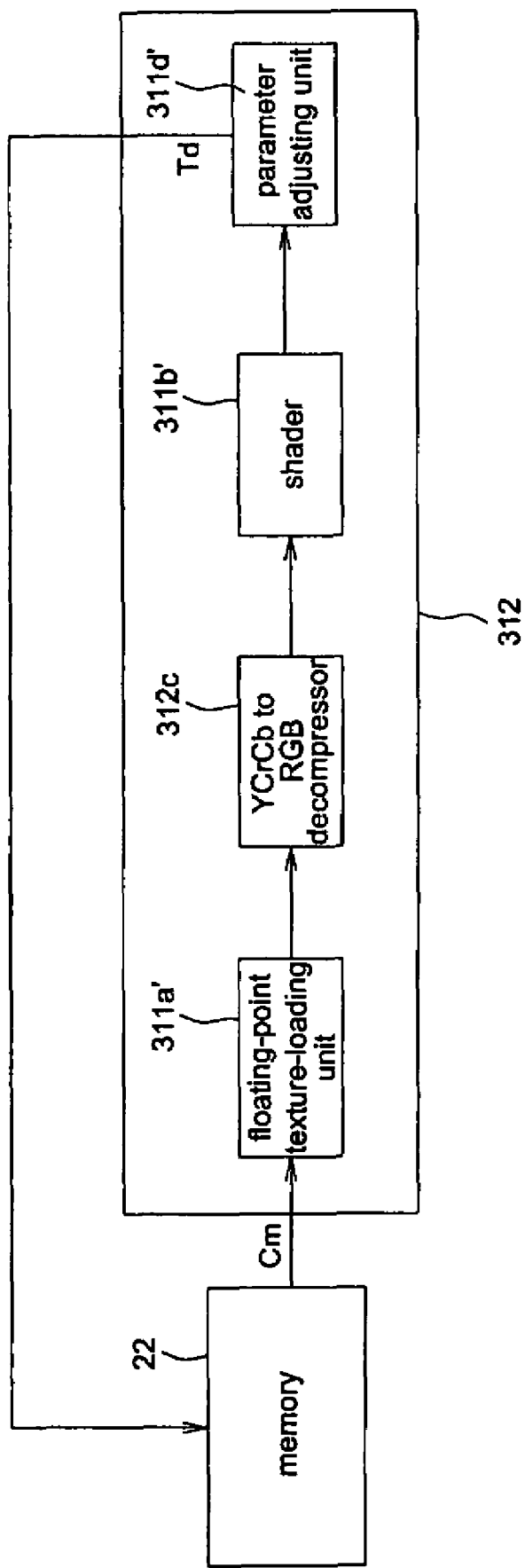
FIG. 3E shows a block diagram illustrating a floating-point graphic decompressor according to an embodiment of the invention.

FIG. 3E shows a block diagram illustrating the floating-point graphic decompressor 312 according to an embodiment of the invention. The floating-point graphic decompressor 312 decompresses the compressed image data Cm (represented as floating-point numbers and in a texture image format) to generate decompressed image data Td (represented as floating-point numbers and in a rendered target image format). The floating-point graphic decompressor 312 includes a floating-point texture-loading unit 311a', a YCrCb to RGB decompressor 312c, a shader 311b', and a parameter adjusting unit 311d'. The parameter adjusting unit 311d' may be a rasterizer.

First, the floating-point texture-loading unit 311a' reads the compression image data Cm stored in the memory 22. Then, the YCrCb to RGB decompressor 312c reads the N number of brightness value $Y_1$-$Y_N$ and the common chroma value Cr'Cb' in the compression image data Cm and converts them into N number of RGB pixels $P_1$-$P_N$. The shader 311b' receives and then shades the N number of RGB pixels $P_1$-$P_N$. Next, the parameter adjusting unit 311d' receives and then adjusts each shaded pixel by performing at least one operation of gamma correction, error correction, and color mixing, and the adjusted pixels are stored in a form of decompression image data Td into the memory 22. Similarly, the decompression image data Td stored in the memory 22 are converted from a rendered target image format to a texture image format according to specific functions to improve image data access speed.

Figure 3F:
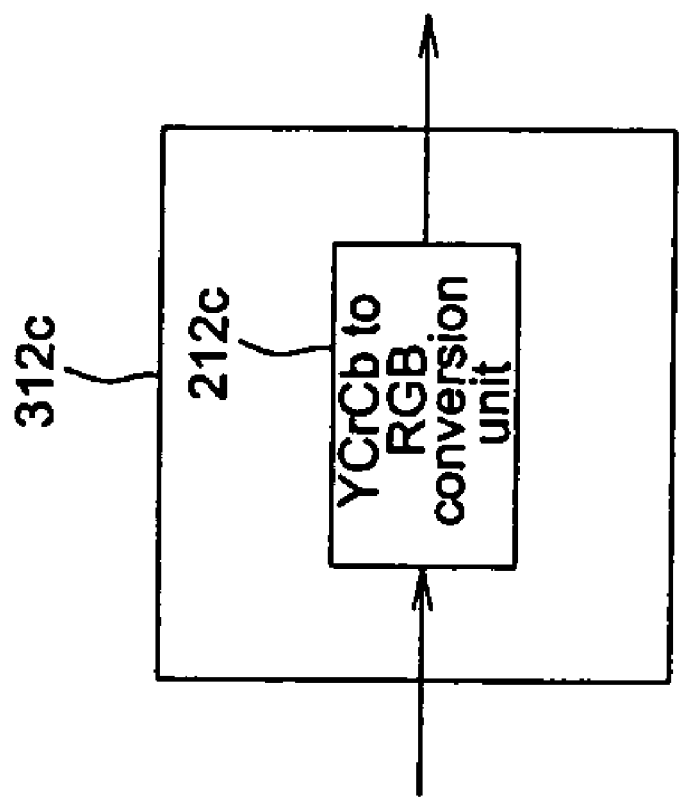
FIG. 3F shows a block diagram illustrating a YCrCb to RGB decompressor according to an embodiment of the invention.

Note that the YCrCb to RGB decompressor 312c can be implemented by a conventional converter such as an YcrCb to RGB conversion unit shown in FIG. 3F or other converter having fine conversion performance. Further, in this embodiment, the graphic processing unit 31 includes two floating-point texture-loading units, two shaders, one RGB to YCrCb compressor, one YCrCb to RGB decompressor, and two parameter adjusting units. Alternatively, the two floating-point texture-loading units, shaders and parameter adjusting units may be respectively incorporated into one floating-point texture-loading unit, shader and parameter adjusting unit.

The following example illustrates the operations of downsampling and mantissa truncating achieved by the floating-point graphic compressor 311 and corresponding decompression processes of the floating-point graphic decompressor 312 with reference to conventional chroma conversion and inverse chroma conversion equations.

First, the chroma conversion equation applied in the RGB to YcrCb conversion can be written as:

$$Y=cr*R+cg*G+cb*B \quad (1.3)$$

$$Cb=\text{blue\_diff}*(B-Y) \quad (1.4)$$

$$Cr=\text{red\_diff}*(R-Y) \quad (1.5),$$

where R,G, and B are input values of primary colors, Y is an output value of brightness, Cr and Cb are output values of chroma, cr, cg, and cb are brightness parameters, blue_diff is a blue chroma parameter that indicates blue color deviation, and red_diff is a red chroma parameter that indicates red color deviation. The values of above parameters are assigned by a firmware and can be dynamically adjusted.

Next, the inverse chroma conversion equation applied in the YcrCb to RGB conversion can be written as:

$$B=Y+(1/\text{blue\_diff})*Cb \quad (1.6)$$

$$R=Y+(1/\text{red\_diff})*Cr \quad (1.7)$$

$$G=Y+(-cr/(cg*\text{red\_diff}))*Cr+(-cb/(cg*\text{blue\_diff}))*Cb \quad (1.8)$$

where the notation definitions have been previously mentioned and thus not explain in detail.

Assume the RGB to YcrCb conversion unit 311c1 of the RGB to YcrCb compressor 311c receives four RGB pixels $P_1$, $P_2$, $P_3$, and $P_4$ whose RGB parameters are defined as:

$$P_1(R_1,G_1,B_1)=(1000, 1200, 900)$$

$$P_2(R_2,G_2,B_2)=(810, 900, 1090)$$

$$P_3(R_3,G_3,B_3)=(900, 1000, 1200)$$

$$P_4(R_4,G_4,B_4)=(1000, 1000, 1000)$$

, and the parameters set by the firmware are cr=0.3, cg=0.6, cb=0.1, blue_diff=1, and red_diff=1.

Thus, the chroma conversion equation T is obtained:

$$Y=0.3R+0.6G+0.1B$$

$$Cb=1*(B-Y)$$

$$Cr=1*(R-Y)$$

Thereafter, substitute the values of RGB parameters into the chroma conversion equation T to obtain respective brightness/chroma values $Y_1Cr_1Cb_1$-$Y_4Cr_4Cb_4$ of the four RGB pixels $P_1$, $P_2$, $P_3$, and $P_4$:

$$T(R_1,G_1,B_1)=P_1(Y_1,Cr_1,Cb_1)=(1110, -110, -210)$$

$$T(R_2,G_2,B_2)=P_2(Y_2,Cr_2,Cb_2)=(892, -82, 198)$$

$$T(R_3,G_3,B_3)=P_3(Y_3,Cr_3,Cb_3)=(990, -90, 210)$$

$$T(R_4,G_4,B_4)=P_4(Y_4,Cr_4,Cb_4)=(1000, 0, 0)$$

Next, the chroma downsampler 311c2 receives the brightness/chroma values $Y_1Cr_1Cb_1$-$Y_4Cr_4Cb_4$ and selects the chroma value of the pixel P2 ($Cr_2$=-82 and $Cb_2$=198) as a common chroma value Cr'Cb', on the reason that the pixel P2 has the smallest brightness value ($Y_2$.892) among the four RGB pixels. Meanwhile, other chroma values $Cr_1$, $Cb_1$, $Cr_3$, $Cb_3$, $Cr_4$, $Cb_4$ are discarded. Then, the chroma truncating unit 311c3 receives the brightness values $Y_1$-$Y_4$ and the common chroma value Cr'Cb' and truncates the mantissa of the common chroma value Cr'Cb'(=-82.198) to obtain a truncated common chroma value Cr'Cb'(=-80,190). Finally, the parameter adjusting unit 311d adjusts the brightness values $Y_1$-$Y_4$ and the common chroma value Cr'Cb' and stores these adjusted values in a form of compressed image data Cm into the memory 22.

Compared to the conventional design where all brightness and chroma values $Y_1$, $Y_2$, $Y_3$, $Y_4$, $Cr_1$, $Cr_2$, $Cr_3$, $Cr_4$, $Cb_1$, $Cb_2$, $Cb_3$ and $Cb_4$ are required to be processed and stored together, the graphic processing device 31 only requires to process and store part brightness and chroma values $Y_1$, $Y_2$, $Y_3$, $Y_4$, Cr' and Cb' in the memory 22 by means of the downsampling and truncating operation of the invention. Hence, since the chroma values except the common chroma value are discarded by the downsampling operation, the processing time as well as the occupied memory space is significantly reduced. Besides, the truncating operation performed by the chroma truncating unit 311c3 may further reduce the occupied memory space.

On the other hand, during decompression processes, the floating-point texture-loading unit 311a' of the floating-point graphic decompressor 312 reads the compressed image data Cm that includes the brightness and chroma values $Y_1, Y_2, Y_3, Y_4$, Cr' and Cb' (=1110,892,990,1000,−80,190), and meanwhile the parameters of the inverse chroma conversion equation are set by the firmware as cr=0.3, cg=0.6, cb=0.1, blue_diff=1, and red_diff=1. Thus, the inverse chroma conversion equation T' can be written as.

$$B=Y+1*Cb$$

$$R=Y+1*Cr$$

$$G=Y+(-0.3/(0.6*1))*Cr+(-0.1/(0.6*1))*Cb$$

Next, substitute the values of the brightness and chroma values $Y_1, Y_2, Y_3, Y_4$, Cr' and Cb' into the inverse chroma conversion equation T' to obtain respective values of the four RGB pixels $P_1', P_2', P_3'$, and $P_4'$:

$$T'(Y_1,Cr',Cb')=P_1'(R_1,G_1,B_1)=(1030,1118,1300)$$

$$T'(Y_2,Cr',Cb')=P_2'(R_2,G_2,B_2)=(812,900,1082)$$

$$T'(Y_3,Cr',Cb')=P_3'(R_3,G_3,B_3)=(910,998,1180)$$

$$T'(Y_4,Cr',Cb')=P_4'(R_4,G_4,B_4)=(920,1008,1190)$$

Thereafter, the parameter adjusting unit 311d' stores the RGB pixels $P_1', P_2', P_3'$, and $P_4'$ in a form of decompressed image data Td into the memory 22. Thereby, the floating-point graphic decompressor 312 may output an image almost the same as the original raw image data Or according to the brightness and chroma values $Y_1, Y_2, Y_3, Y_4$, Cr' and Cb'. Finally, the output image is provided for other image processing device or a display.

According to the invention, since most chroma information not sensitive to the human eye is discarded by means of the downsampling operation, and the mantissa of the common chroma value Cr'Cb' is truncated to further decrease the data amount of the chroma information, the 3D graphic system of the invention may, under the condition that a high dynamic range of luminance levels still remains, have an enhance image processing performance and a reduced occupied memory space.

Figure 4:
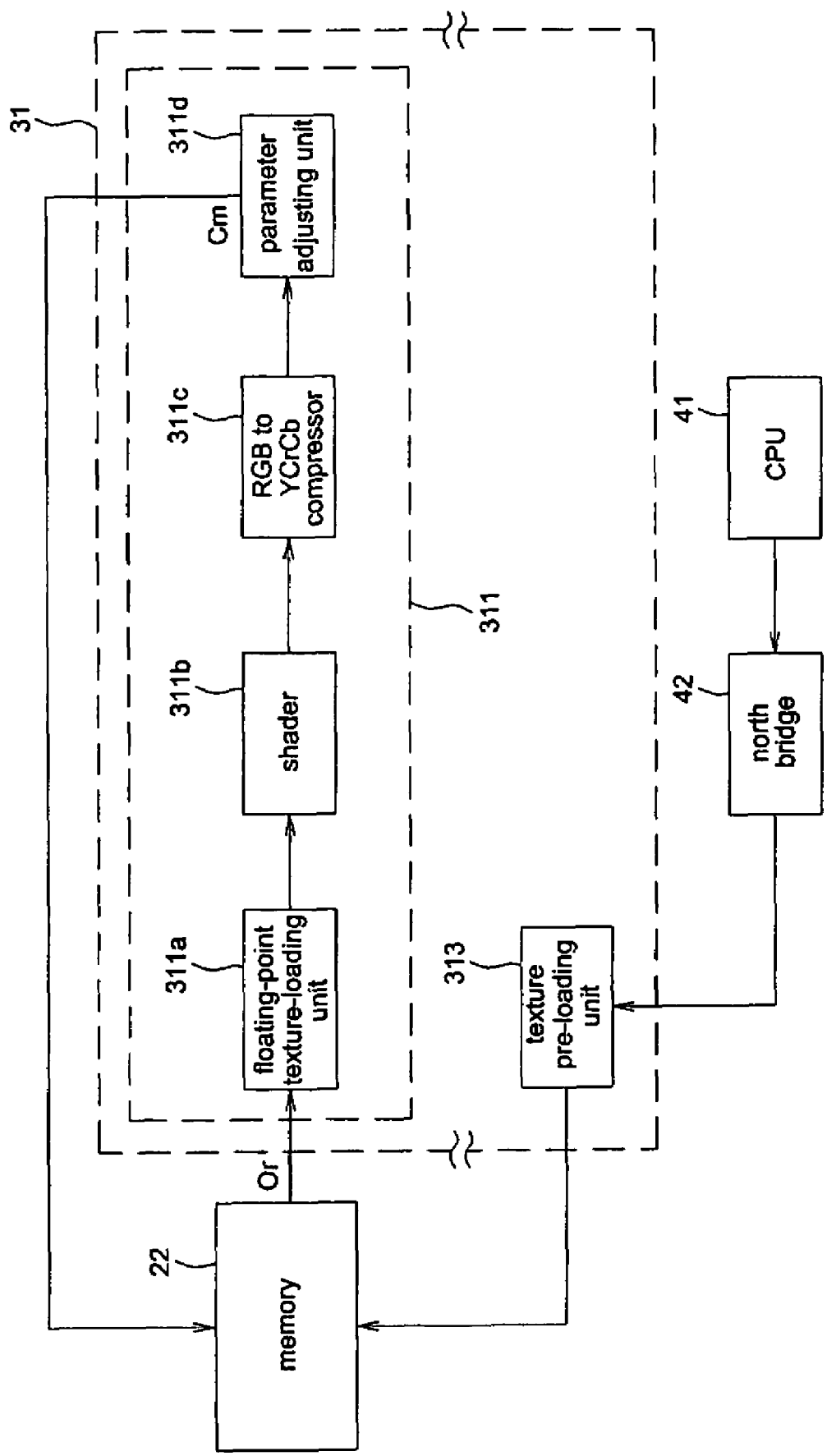
FIG. 4 shows a block diagram illustrating a graphic processing device according to an embodiment of the invention.
Figure 5:
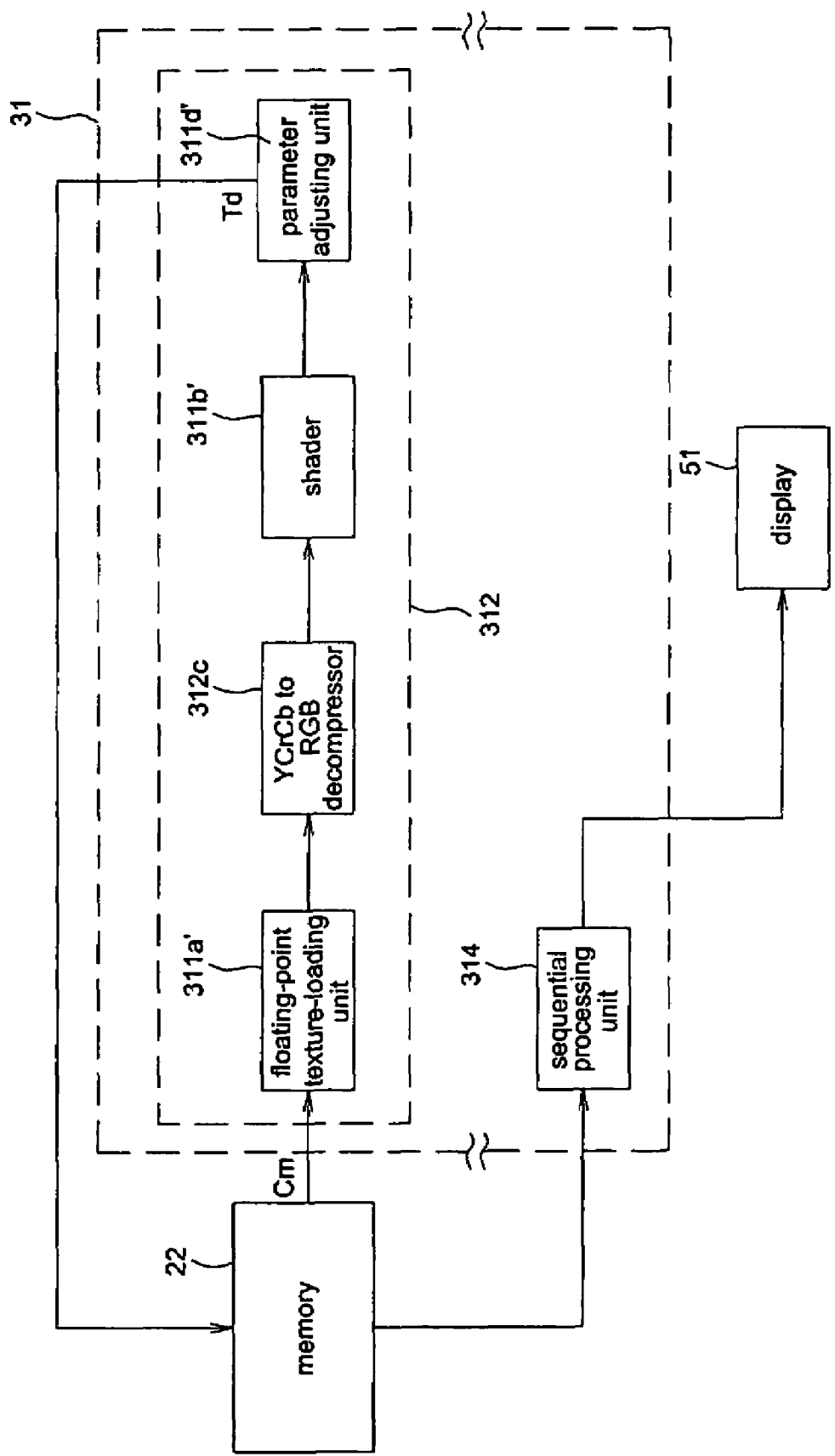
FIG. 5 shows a block diagram illustrating a graphic processing device according to another embodiment of the invention.

Further, as shown in FIG. 4, the graphic processing device 31 may additionally includes a texture pre-loading unit 313. The texture pre-loading unit 313 is used to receive control signals that are transmitted from a CPU 41 and passing through a north bridge 42. When the texture pre-loading unit 313 receives the control signals, the memory 22 outputs image data assigned by the CPU 41 to the graphic processing device 31. Also, referring to FIG. 5, the graphic processing device 31 may further include a sequential processing unit 314 used to output image data to external display 51.

Figure 6:
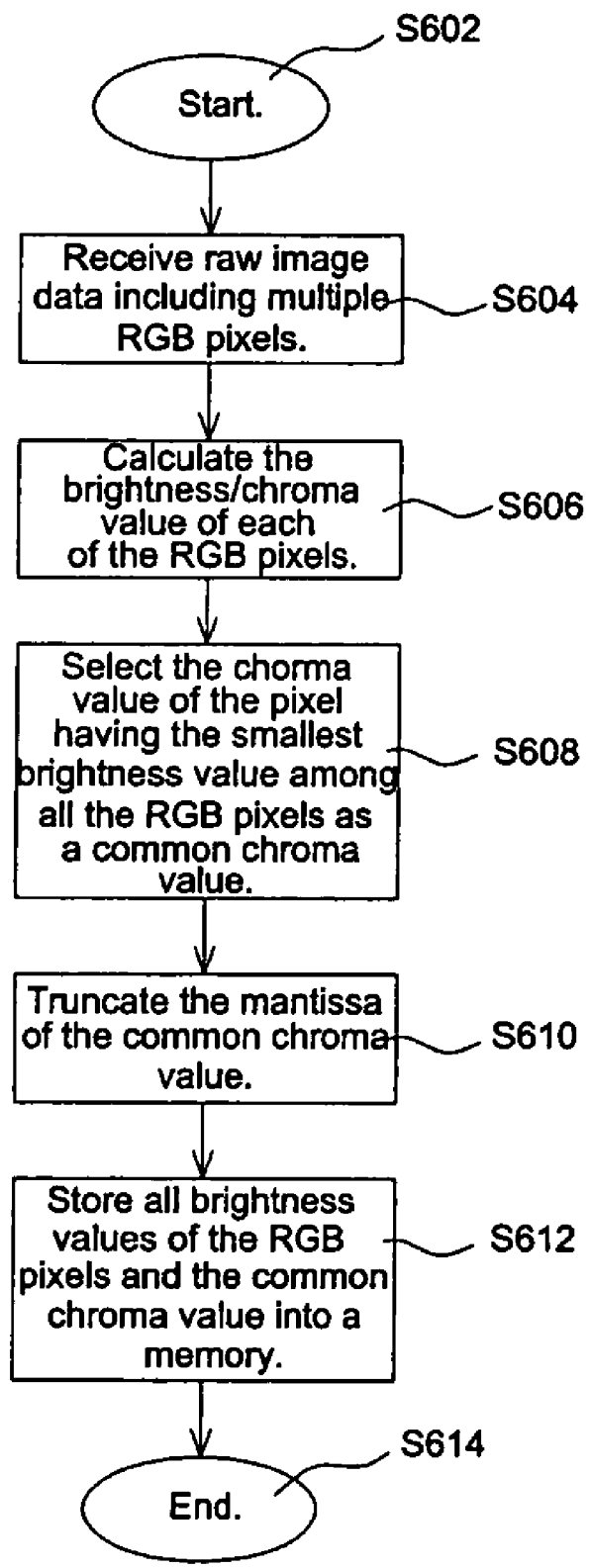
FIG. 6 shows a flow chart illustrating an image compression method of the invention.

FIG. 6 shows a flow chart illustrating an image compression method of the invention, which includes the following steps:

Step S602: Start.

Step S604: Receive raw image data including multiple RGB pixels.

Step S606: Calculate the brightness/chroma value of each of the RGB pixels.

Step S608: Select the chorma value of the pixel having the smallest brightness value among all the RGB pixels as a common chroma value.

Step S610: Truncate the mantissa of the common chroma value.

Step S612: Store all brightness values of the RGB pixels and the common chroma value into a memory.

Step S614: End.

Figure 7:
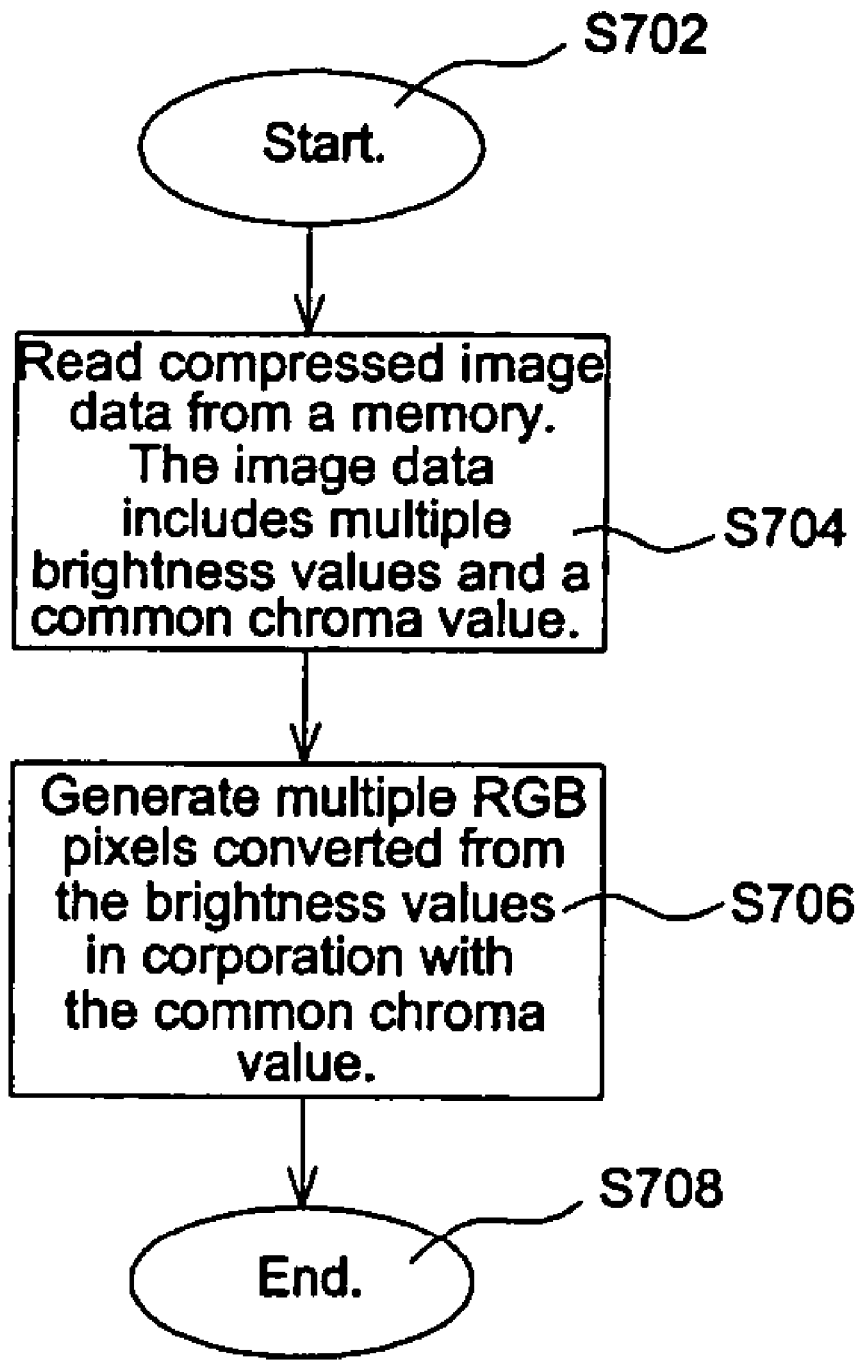
FIG. 7 shows a flow chart illustrating an image decompression method of the invention.

FIG. 7 shows a flow chart illustrating an image decompression method corresponding to the above image compression method, which includes the following steps:

Step S702: Start.

Step S704: Read compressed image data from a memory. The image data includes multiple brightness values and a common chroma value.

Step S706: Generate multiple RGB pixels converted from the brightness values in corporation with the common chroma value.

Step S708: End.

Note that the image compression and decompression device of the invention are exemplified as processing 3D image data, but this is not limited. The image compression and decompression device may also process one dimension (1D) and two dimensions (2D) image data.

While the invention has been described by way of example and in terms of the preferred embodiments, it is to be understood that the invention is not limited to the disclosed embodiments. To the contrary, it is intended to cover various modifications and similar arrangements as would be apparent to those skilled in the art.

What is claimed is:

1. An image compression device, comprising:
    a floating-point texture-loading unit for receiving raw image data that comprises N number of RGB pixels (N is a positive integer);
    a shader for receiving the raw image data and shading the N number of RGB pixels to generate shaded image data;
    a RGB to YCrCb compressor for receiving the shaded image data and calculating the brightness/chroma value of each of the RGB pixels, wherein the chroma value of the RGB pixel having the smallest brightness value among all the RGB pixels is selected as a common chroma value for all the RGB pixels; and
    a parameter adjusting unit for receiving and adjusting N number of brightness values of the RGB pixels and the common chroma value and storing the N number of brightness values and the common chroma value in a form of compressed image data into a memory;
    wherein the raw image data and the compressed image data are represented as floating-numbers, and
    wherein the RGB to YCrCb compressor comprises:
        a RGB to YCrCb conversion unit for receiving the shaded image data and calculating the brightness/chroma value of each of the RGB pixels; and
        a chroma downsampler for selecting the chroma value of the RGB pixel having the smallest brightness value among all the RGB pixels as the common chroma value.

2. The image compression device as claimed in claim 1, wherein the RGB to YCrCb compressor truncates the mantissa of the common chroma value.

3. The image compression device as claimed in claim 1, wherein the parameter adjusting unit performs at least one operation of gamma correction, error correction, and color mixing on the N number of brightness values and the common chroma value.

4. The image compression device as claimed in claim 1, wherein the RGB to YCrCb compressor further comprises a chroma truncating unit for truncating the mantissa of the common chroma value.

5. The image compression device as claimed in claim 1, wherein the raw image data are in a texture image format and the compressed image data are in a rendered target image format.

6. The image compression device as claimed in claim 1, wherein the raw image data comprise one dimension (1D), two dimensions (2D), or three dimensions (3D) image data.

* * * * *